UNITED STATES PATENT OFFICE 2,561,379

ALUMINUM CARBOXYLIC ACID SOAP-HEAVY METAL SALT OF HYDROXY QUINOLINE FUNGICIDAL COMPOSITION AND PREPARATION THEREOF

Victor N. Kalberg, Chicago, Ill., assignor to Scientific Oil Compounding Company, Inc., a corporation of Illinois No Drawing. Application November 15, 1947, Serial No. 786,324

3 Claims. (Cl. 260—270)

This invention relates to a fungicidal composition and to a method of making the same. In particular it relates to a method of solubilizing or dispersing copper-8-quinolinolate and to the use of a composition containing the same which is capable of being dissolved or dispersed readily in a suitable solvent, and a solution or dispersion thereof, as a fungicidal composition.

Copper-8-quinolinolate, the copper salt of 8-hydroxyquinoline, has the following structural formula:

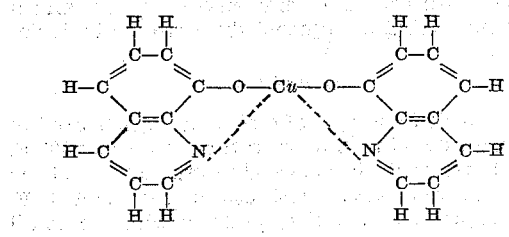

It is a known fungicidal material and is particularly effective as a fungicide and as a mildew-proofing agent for wood, leather, cotton, wool and other fabric materials made from organic fibers, protective coatings derived from resins, either natural or synthetic, and the like. Notwithstanding the effectiveness of copper-8-quinolinolate as a fungicide its use for that purpose has been extremely limited in the past due to its insolubility in water and particularly due to its insolubility in oils, oily materials and the common organic solvents commonly used in the coating composition art.

In accordance with the present invention a composition containing copper-8-quinolinolate, from which a commercially usable, non-aqueous or substantially non-aqueous solution or dispersion may readily be prepared, may be made by reacting a heavy metal soap, especially a zinc soap or a nickel soap, or an aluminum soap with copper-8-quinolinolate, at an elevated temperature until a homogeneous composition is formed. The proportions of the reactants which may be used in preparing this composition may be varied rather widely, as desired, but from the practical standpoint at least an equal amount of metal soap, with respect to copper-8-quinolinolate, on a weight basis, should be used. It is preferred that a substantial excess of metal soap with respect to copper-8-quinolinolate be used in carrying out the reaction, since the proportion of metal soap in excess of that required to react with copper-8-quinolinolate serves as a reaction medium in which the reaction product of the metal soap and the copper-8-quinolinolate is soluble at elevated temperatures of from about 150–275° F. and higher, depending upon the particular reaction medium. The reaction temperature may be varied widely, depending upon the particular metal soap used, from about 200° F. to 550° F., and higher, up to the decomposition temperature of the copper-8-quinolinolate and/or the flash point of the reaction medium used.

The reaction is preferably carried out in a reaction medium which is capable of withstanding temperatures of about 400–550° F. and in which the reaction product is soluble at the elevated temperatures referred to above. This reaction medium may be the same metal soap used in making the reaction product or it may be some other metal soap or a mixture of metal soaps. It may also be a mixture of a metal soap and a higher fatty acid having at least six carbon atoms in the molecule, such as one of the soap-forming fatty acids named below, or one such higher fatty acid or mixture of fatty acids, or it may be a vegetable or animal oil such as linseed oil, China-wood oil, cottonseed oil, soybean oil, palm oil, coconut oil, sardine and other fish oils, and the like. The preferred reaction medium is one or more of these vegetable or animal oils because not only do they have the properties required of a reaction medium in accordance with the present invention, but they have also the ability of bodying under the conditions of heat encountered during the reaction.

The heavy metal soaps which are used as reactants in accordance with the present invention are water-insoluble soaps of a heavy metal and a soap-forming acid or a mixture of such acids. Thus, the soaps may be soaps of lead, manganese, cobalt, nickel, iron, copper, tin, and like heavy metals. The preferred soaps are the zinc and nickel soaps because the results obtained with these soaps are markedly superior to those obtainable with the other heavy metal soaps. The soap-forming acids used in forming the heavy metal soaps include caproic acid, caprylic acid, capric acid, lauric acid, myristic acid, palmitic acid, stearic acid, oleic acid, linoleic acid, linolenic acid, palmitoleic acid, melissic acid, hydroxystearic acid, ricinoleic acid, and the like, and mixtures thereof. The preferred soap-forming acids are those saturated and unsaturated higher aliphatic acids containing from twelve to eighteen carbon atoms. Other soap-forming acids which may be used in forming the heavy metal soap used in accordance with the present invention are the mixed higher fatty acids derived from animal or vegetable sources such as, for example, sardine and other fish oils, lard, coconut oil, sesame oil, soybean oil, corn oil or partially or completely hydrogenated derivatives of such oils, fatty acids derived from carnauba, spermaceti, beeswax, candelilla wax and like waxes, and carboxylic acids derived from petroleum or other hydrocarbons. Other soap-forming acids which may be used are naphthenic acid, tall oil fatty acids, and hydroaromatic acids such as abietic acid and the like. Rosin may be used as the source of acid for making the heavy metal soaps.

The following example is illustrative of a method of preparing the reaction product of the present invention. In this example the heavy metal soap, specifically zinc oleate, is formed in situ. Also in this example, as well as in all other examples, the term "part" refers to parts by weight.

EXAMPLE 1

100 parts by weight of oleic acid were heated in an open vessel to a temperature of about 200° F. and 10 parts of zinc oxide were added and the mixture was heated, with stirring, up to 420° F. over a period of about 8-10 minutes, at which time the zinc oleate which was formed went into solution in the excess of oleic acid. The solution of zinc oleate was held at a temperature of about 400°-430° F. and 10 parts of copper-8-quinolinolate were stirred into the solution. The copper-8-quinolinolate went into solution quickly and the resulting solution was a free flowing, limpid mass, substantially clear and free from undissolved matter when observed by the naked eye under a light.

The product maintained its liquid state while hot, but at a temperature below about 120° F. it began to solidify and on cooling to room temperature it caked into a relatively soft mass very smooth to the touch when rubbed between the fingers. This solidified product was soluble in mineral spirits, vegetables oils, fatty acids, and the like with heating. The temperature at which the mass went into solution in the solvent varied with the particular solvent. Thus, for example, with mineral spirits it went into solution at about 175° F., and with linseed oil it went in at about 300° F.

From variations of the procedure of Example 1, it was found that copper-8-quinolinolate readily goes into solution in the zinc oleate solution when that solution is maintained at a temperature of 375°-430° F. It was found that at temperatures slightly below about 300° F. the copper-8-quinolinolate went into solution very slowly. Its solubility in the zinc oleate solution at about 300° F. was fairly rapid. The solution of the copper-8-quinolinolate in the zinc oleate solution at a temperature of 375°-430° F. was prompt.

The proportions of the copper-8-quinolinolate in the above example may be varied widely from about 1 part or lower up to about 10½ to 11 parts. With amounts of copper-8-quinolinolate below 10 parts the solutions obtained are improved. In general, the character of the solutions obtained improve progressively where the amounts of copper-8-quinolinolate used is decreased from the 10 parts in the above example to about 3 parts. Those obtained with amounts of copper-8-quinolinolate below about 3 parts do not differ substantially from those obtained using 3 parts. The differences in solutions referred to are, generally, differences in brilliancy and clarity of solution and in over-all stability as the solution undergoes temperature variations.

The reaction product of a heavy metal soap and copper-8-quinolinolate, either in the hot liquid state or in the solidified state or in the reheated and reliquefied state, may be used as such as a fungicidal composition, as may also the hot and cold products of Example 1. The solidifed products may be used as rubbing compounds to impart fungicide-resisting properties to leather, for example. The hot liquid products may be used as coatings or impregnants in accordance with conventional procedures.

Although the reaction products of Example 1 have utility per se, their use as such is not desirable because of the inordinately high percentage of copper-8-quinolinolate present in the composition, which is wasteful of the material, and because the hot liquid product, the solidified product and the reliquefied product do not have sufficient penetrating properties at normal room temperatures of about 70°-75° F. Accordingly, the reaction product of the heavy metal soap and copper-8-quinolinolate or the product of Example 1 constitutes a base material which for commercial purposes should be dissolved and compounded with suitable vehicles before use, to bring the copper-8-quinolinolate to the desired low concentration and to impart to the material desired penetrating and film-forming properties. The base material can be dispersed readily in water, with the aid of emulsifying agents, and it may be used in an aqueous dispersed state, if desired.

EXAMPLE 2

100 parts by weight of oleic acid were heated in an open vessel to a temperature of about 200° F. and 10 parts of nickel acetate were added and the mixture was heated, with stirring, up to 420° F. over a period of about ½ hour, at which time all of the acetic acid which was formed was driven off and the nickel oleate which was formed went into solution in the excess of oleic acid. This solution was cooled to about 200° F. and 10 parts of copper-8-quinolinolate were stirred into the solution and the solution was brought up to about 300° F., at which time the copper-8-quinolinolate went into solution. The resulting solution had greater clarity and brilliancy than the solution of Example 1. When this solution was cooled to room temperature it thickened somewhat, but retained its limpid, liquid state. This product when thinned with mineral spirits had excellent penetrating properties and functioned effectively as a fungicidal material.

In accordance with the present invention I have prepared commercially suitable fungicidal compositions containing the reaction product of the present invention, which at normal room temperatures are in a free flowing liquid state, with the reaction product in uniform solution or dispersion throughout. These compositions remain liquid and constant at temperatures even somewhat below 70° F. Not only do they have particularly effective fungicidal, penetrating and film-forming properties, but, surprisingly, they impart strength to materials treated therewith. This will be evident from the test results carried out with the composition produced in accordance with the following Example 3, which composition was identified in these tests as Dri-Seal No. 940.

EXAMPLE 3

255 lbs. of zinc resinate (8%), 63¾ lbs. of a

100% phenol-formaldehyde resin of the bis-phenol type [a B-stage resin having an acid number of 83, a melting point (Wilbur method) of 256° F., and a specific gravity at 20/20° C. of 1.07], and 76.5 lbs. of Z-3 (Gardner-Holdt) heat bodied linseed oil were mixed in an open vessel and the mixture was heated at about 550° F., with stirring, for one hour. The mass was then cooled to about 300° F. and 43.4 lbs. of copper-8-quinolinolate were added with constant agitation. The temperature was then raised gradually to 400°–420° F. at which time the copper-8-quinolinolate went into solution. Total elapsed time for this stage of the process was one hour.

The heat was removed and when the temperature of the solution of copper-8-quinolinolate was at about 400° F., 337 lbs. of zinc naphthenate (8%) were added with constant agitation. This effected a temperature drop in the mass to about 275° F. There was then added to the mass 325 lbs. of 125°–127° F. M. P. paraffin wax and the mixture was stirred until the wax went into solution. At this stage of the process the temperature had dropped to about 200° F. The mass was then thinned with a solution consisting of 4422 lbs. of a solvent of petroleum origin, 25½ lbs. of lead naphthenate (24%) and 74 lbs. of cobalt naphthenate (6%).

The petroleum solvent used as a thinner in the above example had an I. B. of 325° and an E. P. of 388° F., A. P. I. gravity at 60° F. of 45.5, a sp. gr. at the same temperature of 0.799, and a flash point (TCC) of 116° F. Toluol, xylol, carbon tetrachloride and other petroleum solvents or coal tar solvents may be used in lieu of the thinner in the foregoing example.

The composition obtained in accordance with Example 3 was a free-flowing liquid at 70° F. It contained 2.5% of copper-8-quinolinolate based on the weight of the solids (on materials other than the thinner). Tests were carried out on this material (identified as Dri-Seal No. 940) to determine the efficacy of the material as a fungicide and to determine its effect on materials treated therewith. The tests were as follows:

Dri-Seal No. 940 was applied to wood samples 1″ x 3″ and leather squares 2″ x 2″ by soaking under vacuum for 20 minutes and drying for 6 hours. The treated specimens and untreated control specimens were placed on a sterile nutrient agar medium with a pH of 5.5, which was used for the substratum in petri dishes. The specimens were sprayed with a spore suspension of the following organims and incubated at 30° C. for 14 days:

*Chaetomium globosum*
*Penicillium citrinum*
*Aspergillus niger*
*Aspergillus terreus*
*Trichoderma viride*
*Aspergillus flavus*

At the conclusion of this test period it was found that fungi were growing over the entire surface of the leather and wood control specimens and that no growth existed on the treated wood and leather specimens.

The treated wood and leather specimens were polished with a conventional polishing material and a high polish was obtained thereon.

In additional tests, samples of 10 oz. duck were cut into 4″ x 6″ squares, the duck was washed in soap suds, rinsed thoroughly and dried. 10 squares were dipped into Dri-Seal No. 940, drained and dried for 6 hours. 5 of these dried squares were leached for 24 hours and the remaining 5 were unleached. 7 squares of washed duck were left untreated as a control.

All of the squares were buried for 14 days in a soil burial chamber at 90° F. with 98% relative humidity after their tensile strengths were taken on a 400 lb. vertical Scott tester. After a 14-day exposure period, all specimens were washed thoroughly in warm water and dried in an air conditioning chamber for 24 hours. Tensile strengths were then taken on the same Scott tester. The results are recorded in the following table:

*Table*

| | T. S. in lbs. Not Buried | T. S. in lbs. Buried | Per Cent Loss | Per Cent Gain |
|---|---|---|---|---|
| 940 | 310 | 343.2 | | 12.3 |
| 940 Leached | 353 | 355.2 | | 15.3 |
| Untreated | 301.2 | 13.8 | 95.5 | |

The present invention is not to be construed as limited to the details of Example 3. Thus, for example the phenol-formaldehyde resin may be omitted or it may be replaced by any resin used in varnish making such as rosin, kauri, copal, congal, ester gum, reaction products of rosin, maleic anhydride and a polyhydric alcohol such as glycol, glycerin, pentaerythritol, sorbitol, mannitol, as well as other synthetic resins. The paraffin wax may be omitted or it may be replaced by any other suitable water-repellent wax, either animal, vegetable, mineral or synthetic, such as beeswax, carnauba wax, spermacetic wax, candelilla wax, and the like. The zinc resinate in the example may be replaced by other heavy metal soaps and the linseed oil may be replaced by other suitable vehicles, such as those named above. In general, the vehicle may be any vegetable oil, either drying or semi-drying or non-drying, including castor oil and dehydrated castor oil or a combination of either one or both of these oils with one or more of the vegetable oils named above. It is, of course, manifest that the heavy metal soap may be formed in situ, as in Example 1.

The zinc naphthenate used in preparing the composition of Example 3 functions primarily as a stabilizing material to hold the various solid materials in solution in the thinner and to accelerate drying of the composition. It also functions as an anti-oxidant. Zinc naphthenate can be replaced by small amounts of other suitable anti-oxidants such as phenyl-salicylate (in amounts up to about 3%), and tertiary butyl catechol, hydroquinone and guaiacol (in amounts up to about ½ to 1%). It is preferred to use the relatively large amounts of the zinc naphthenate of the example, however, because of its stabilizing and drying properties. The lead naphthenate and cobalt naphthenate serve as driers and may, of course, be replaced by other suitable driers.

In Example 3, the copper-8-quinolinolate may be varied from about 1 to 3½% by weight, based on the weight of all the constituents of the composition other than the thinner. The amount of zinc resinate used may also be varied, up or down about 25% from the amount stated. The linseed oil may be varied up or down 25% from the amount stated and the zinc naphthenate can be varied 50% up or down from the amount stated. The latter can, of course, be omitted, as can also the resin and wax, as noted above. If it is desired to enhance the waterproofing properties of the composition the amount of wax used may be increased up to 100% of that stated. Other variations will readily suggest themselves to a skilled worker in the art.

While in the hereinabove description of the invention particular emphasis has been placed on the products of reaction under the influence of heat of a heavy metal soap and copper-8-quinolinolate, the invention is not to be construed as limited to such products since my invention also contemplates products made by heating aluminum soap with copper-8-quinolinolate.

The composition of the present invention not only inhibits the growth of all fungus organisms, but it also klls the activity of all existing growth on contact. Furthermore, textiles, leather, wood and the like impregnated with the fungicidal composition of the present invention are not attacked to any appreciable extent by soil animal life. The fungicidal composition of the present invention is stable for long periods of time and because of this and its non-toxicity to human beings it lends itself for general use.

I claim:

1. The method of forming a composition of matter consisting of heating at a temperature below the lowest decomposition temperature of the reactants, an aluminum carboxylic acid soap and copper-8-quinolinolate.

2. As a fungicidal composition the product produced by the method of claim 1.

3. The method of forming a composition of matter consisting of heating at a temperature between about 200° F. and the lowest decomposition temperature of the reactants, an aluminum carboxylic acid soap and copper-8-quinolinolate.

VICTOR N. KALBERG.

REFERENCES CITED

The following references are of record in the file of this patent:

UNITED STATES PATENTS

| Number | Name | Date |
|---|---|---|
| 1,424,306 | Hoskins | Aug. 1, 1922 |
| 1,482,416 | Snelling | Feb. 5, 1924 |
| 2,069,247 | Hoag | Feb. 2, 1937 |
| 2,371,884 | Gardner | Mar. 20, 1945 |
| 2,381,863 | Benignus | Aug. 14, 1945 |
| 2,387,591 | Kolb | Oct. 23, 1945 |
| 2,457,025 | Benignus | Dec. 21, 1948 |

FOREIGN PATENTS

| Number | Country | Date |
|---|---|---|
| 472,561 | France | Aug. 8, 1914 |
| 491,501 | Great Britain | Mar. 1, 1938 |

OTHER REFERENCES

Metallic Soaps (1940), Metasap Co., Inc., Harrison, N. J., pp. 1, 3, 4, 6, 11, 15, and 18.